United States Patent [19]

Quick

[11] 4,450,778
[45] May 29, 1984

[54] SUGAR CANE BILLET PLANTER

[75] Inventor: Donald J. Quick, Bundaberg, Australia

[73] Assignee: Massey-Ferguson Services N.V., Curacao, Netherlands Antilles

[21] Appl. No.: 364,939

[22] PCT Filed: Jul. 25, 1980

[86] PCT No.: PCT/AU80/00037
§ 371 Date: Mar. 22, 1982
§ 102(e) Date: Mar. 22, 1982

[87] PCT Pub. No.: WO82/00399
PCT Pub. Date: Feb. 18, 1982

[51] Int. Cl.³ .................................. A01C 11/00
[52] U.S. Cl. .................................. 111/3; 111/34; 414/523
[58] Field of Search ............... 111/2, 3, 34; 198/454, 198/455, 701; 221/161, 162, 251; 414/523

[56] References Cited

U.S. PATENT DOCUMENTS

| | | | |
|---|---|---|---|
| 2,617,556 | 11/1952 | Hulett | 111/3 |
| 3,344,830 | 10/1967 | Longman | 111/3 |
| 3,907,135 | 9/1975 | Populin et al. | 111/3 |
| 3,923,332 | 12/1975 | Shirouzu | 111/2 |
| 3,943,862 | 3/1976 | Populin et al. | 111/3 |
| 4,119,024 | 10/1978 | White | 198/455 |
| 4,204,491 | 5/1980 | Quick | 111/34 |
| 4,314,514 | 2/1982 | Binder | 111/3 |

FOREIGN PATENT DOCUMENTS

| | | | |
|---|---|---|---|
| 62154 | 2/1967 | Australia | 111/3 |
| 245289 | 4/1912 | Fed. Rep. of Germany | 111/34 |
| 572793 | 1/1923 | France | 111/34 |

*Primary Examiner*—James R. Feyrer
*Attorney, Agent, or Firm*—Robert L. Farris

[57] ABSTRACT

The objective of the invention is to provide a novel doffer in combination with a chain and slat conveyor which will remove excess billets from the slats with minimal damage to the eyes on the cane billets.

The cane billet planter 10 includes a billet hopper 16, and a billet metering mechanism 18. The planter 10 may also have a furrow opening assembly 20 and a fertilizer distributor 22, if desired. The billet metering mechanism 18 includes a billet delivery assembly 84 and an endless chain and slat conveyor 86. The upper shaft 88 of the conveyor 86 has a plurality of sprockets 92. Projections 134, 136 and 138 extend outwardly from the upper shaft 88 between adjacent sprockets 92. The surface of the arcuate member 140 of each projection 134, 136 and 138 engages excess billets on each conveyor slat 102 and gently knocks excess billets off the slat. The excess billets fall from the conveyor slat 102 and onto the return sheet 226. These excess billets slide down the return sheet 226, away from the endless chain and slat conveyor 86 and onto the mass of billets in the hopper 16.

7 Claims, 3 Drawing Figures

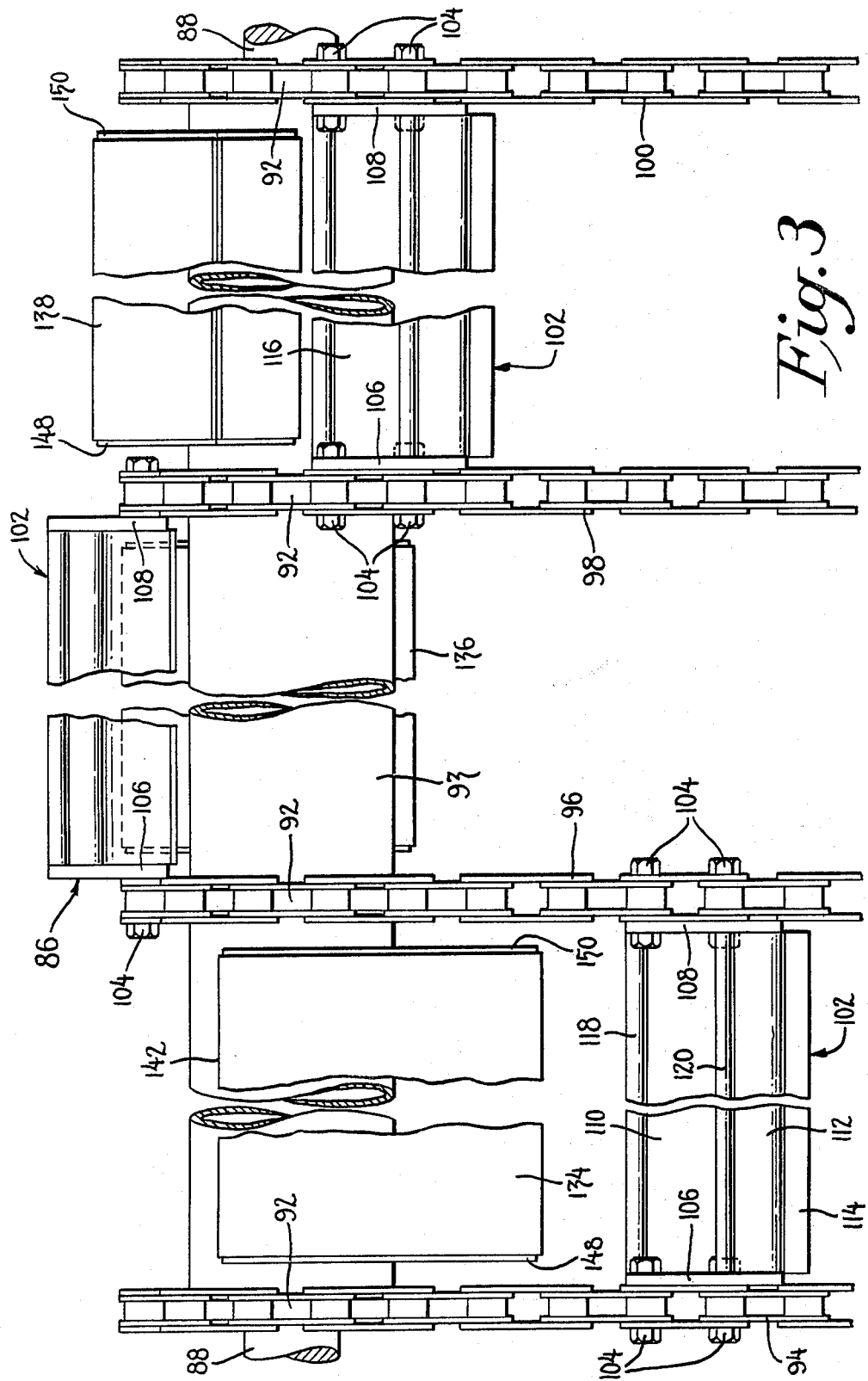

SUGAR CANE BILLET PLANTER

TECHNICAL FIELD

The invention relates to a planter for sugar cane cut into billets about 45 centimeters long. The planter includes a chain and slat conveyor for metering billets out of a hopper. A doffer is provided to remove excess billets from the slats on the conveyor to help control the discharge rate.

BACKGROUND ART

The mechanical sugar cane billet planters developed to date have not successfully solved all the problems associated with planting cane. A number of these planters require people to meter the can into furrows by hand. Some of the planters developed in the past deliver substantially more cane to the furrow than required in order to ensure that there is sufficient cane in all parts of the furrow. Other planters have been relatively successful at metering cane billets into a furrow but in the process have damaged the eyes on the billets. The eyes on cane billets are susceptible to damage during handling which will prevent the eyes from growing.

DISCLOSURE OF THE INVENTION

The sugar cane billet planter includes a frame, a hitch assembly on the frame for attaching the frame to a draft vehicle, a sugar cane billet hopper mounted on the frame and a billet metering mechanism. The billet metering mechanism includes a billet delivery assembly mounted on the frame for delivering billets to a furrow in the soil and an endless chain and slat conveyor mounted on the frame for conveying billets out of the hopper and delivering them to the cane billet delivery assembly. The endless chain and slat conveyor includes an upper roller with projection means that extends outwardly from the axis of rotation of the upper roller past the endless chain and between the slats for doffing excess billets from the slats.

The projection means on the upper roller includes an arcuate billet engaging surface that is timed with the slats so that the arcuate surface does not contact a slat.

A return guide sheet is provided to catch the excess billets doffed from the slats by the projection means. Excess billets fall on the guide sheet after they are pushed off the slats by the projection means. These excess billets slide gently down the guide sheet and fall back into the billet hopper.

BRIEF DESCRIPTION OF THE DRAWING

FIG. 3 is a reduced scale sectional view taken along lines 3—3 of FIG. 2.

BEST MODE FOR CARRYING OUT THE INVENTION

Figure 1:
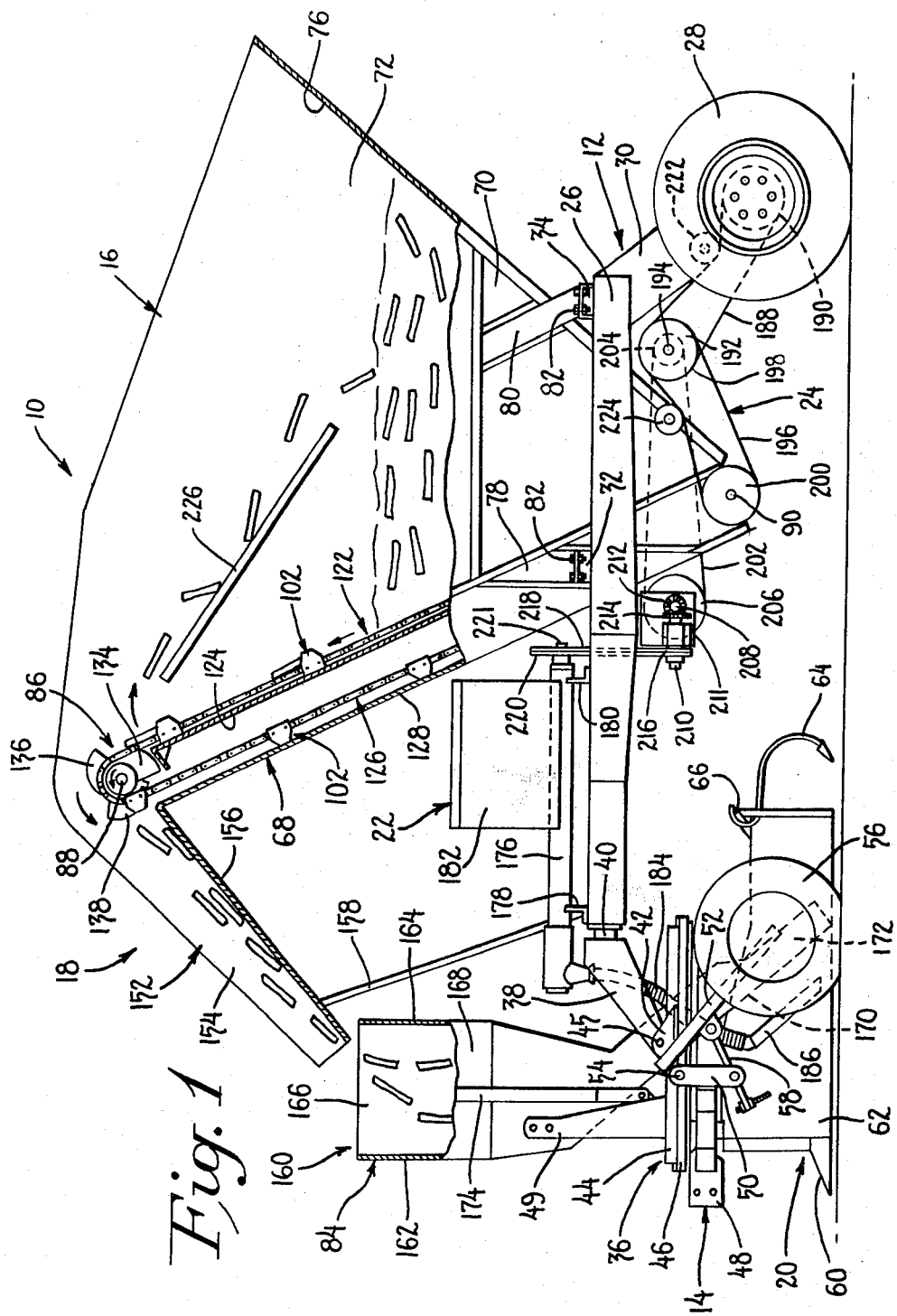
FIG. 1 is a side elevation of the sugar cane billet planter with portions broken away to show the inside of the hopper and the billet metering mechanism.

The sugar cane billet planter 10 includes a frame 12, a hitch assembly 14, a sugar cane billet hopper 16 and a billet metering mechanism 18. Normally, the sugar cane billet planter would also include a furrow opening assembly 20 and a fertilizer distributor 22. A drive 24 for the billet metering mechanism 18 and the fertilizer distributor 22 must also be provided.

The frame 12 as shown in FIG. 1 includes a horizontal fore and aft rear frame section 26. A pair of support wheels 28 are rotatably secured to struts 30 extending downwardly from the rear portion of the horizontal fore and aft rear frame section 26 of the frame 12. Hopper attaching flanges 32 and 34 are integral with the horizontal fore and aft rear frame section 26 of the frame 12.

A forward frame section 36 includes a yoke 38 pivotally secured to the horizontal fore and aft rear frame section 26 by a shaft 40. The shaft 40 is integral with the yoke 38 and is pivotally retained in the horizontal fore and aft rear frame section 26 for pivotal movement about a horizontal fore and aft axis. The lower forward arm portions of the yoke 38 are pivotally secured to ears 42 on a ring 44 by horizontal transverse pivot pins 45.

The ring 44 is pivotally secured to connector ring 46 for pivotal movement relative to the ring 44 about a generally vertical axis. A hitch assembly 14 including attaching plates 48, adapted to be connected to the lower draft links of a tractor and mast members 49 adapted to be connected to the upper draft link of a tractor, are welded to the connector ring 46. Cross bars 50 are welded to and extend laterally from the connector ring 46. A wheel support arm 52 is pivotally secured to the free end of each cross bar 50 by a pin 54. A gauge wheel 56 is rotatably secured to the rear free end of each wheel support arm 52. A gauge wheel adjustment screw 58 is secured to each wheel support arm 52 and to the cross bar 50. Rotation of the gauge wheel adjustment screws 58 pivots the wheel support arms 52 about the axis of the pins 54 thereby setting the height of the connector ring 46 relative to the ground.

A furrow opening assembly 20 including a furrow opener 60 and a pair of furrow forming plates 62 are secured to the connector ring 46. The furrow forming plates 62 keep soil from sliding down into the furrow until can billets have been deposited in the furrow. A pair of tines 64 are secured to the ends on a cross bar 66 secured to the upper rear of the furrow forming plates 62. In operation, the tines 64 till the sides of the furrow and cover the cane billets. In some areas of the world, furrows are formed in the fields by a separate machine prior to planting. In these areas the furrow opening assembly 20 would not be needed. Some cane growers also like to cover the cane billets in a separate operation. The tines 64 can be removed to accommodate these growers.

A sugar cane billet hopper 16 with a front wall assembly 68, side walls 70 and 72 and a rear wall 76, has front and rear reinforcing channels 78 and 80. The lower portions of the front and rear reinforcing channels 78 and 80 are secured to the hopper attaching flanges 32 and 34 on the frame 12 by bolts 82.

The billet metering mechanism 18 includes a billet delivery assembly 84 and an endless chain and slat conveyor 86. The endless chain and slat conveyor 86, which is integral with the front wall assembly 68 of the sugar cane billet hopper 10, has an upper shaft 88 and a lower shaft 90 journalled in the side walls 70 and 72 of the sugar can billet hopper 16. A plurality of sprockets 92 are secured to an enlarged diameter center portion 93 of the upper shaft 88. A plurality of sprockets (not shown) are secured to the lower shaft 90 and in alignment with sprockets 92 on the upper shaft 88. Endless chains 94, 96 and 98 and 100 are trained around the sprockets 92 on the upper shaft 88 and the sprockets on the lower shaft 90. Conveyor slats 102 are secured to adjacent endless chains 94, 96, 98 and 100 by fasteners 104. Each conveyor slat 102 includes end walls 106 and 108 a back wall 110 welded to the end walls 106 and 108 and a bottom wall 112 formed to create a pocket for holding billets. The bottom wall 112 also has a reinforcing flange 114. A bar 116 extends between the end walls 106, 108 and is welded to the back wall 110 and to the bottom wall 112 adjacent the reinforcing flange 114. A round rod 118 is welded to the free upper edge of the back wall 110. Another round rod 120 is welded to the outer free edge of the bottom wall 112. The round rod 120 reinforces the bottom wall 112 and reduces the possibility of damage to cane billets.

The conveying run 122 of the endless chain and slat conveyor 86 moves up the wall 124. The wall 124 is secured to the side walls 70 and 72 of the sugar cane billet hopper 16. The return run 126 of the endless chain and slat conveyor 86 is between the wall 124 and an outer wall 128. The outer wall 128, like the wall 124 is secured to the side walls 70 and 72. A lip 130 reinforced by gussets 132 is formed on the upper edge of the wall 124 to prevent billets from falling over the upper edge of the wall 124 and into the space between the return run 126 and the conveying run 122 of the endless chain and slat conveyor 86.

As the conveyor slats 102 move up through the billets in the sugar cane billet hopper 16, cane billets are picked up and elevated. In order to control the delivery rate projections 134, 136 and 138 are provided as doffers to remove excess billets from the conveyor slats 102. Each projection 134, 136 and 138 is formed by an arcuate member 140 with a leading edge 142 relative to the direction of rotation welded to the enlarged diameter center portion 93 of the upper shaft 88. A flat plate 144 is welded to the enlarged diameter center portion 93 of the upper shaft 88 and extends generally radially outwardly to the trailing edge 146 of the arcuate member 140. Reinforcing plates 148 and 150 are welded to the sides of the flat plates 144 and the arcuate members 140.

Figure 2:
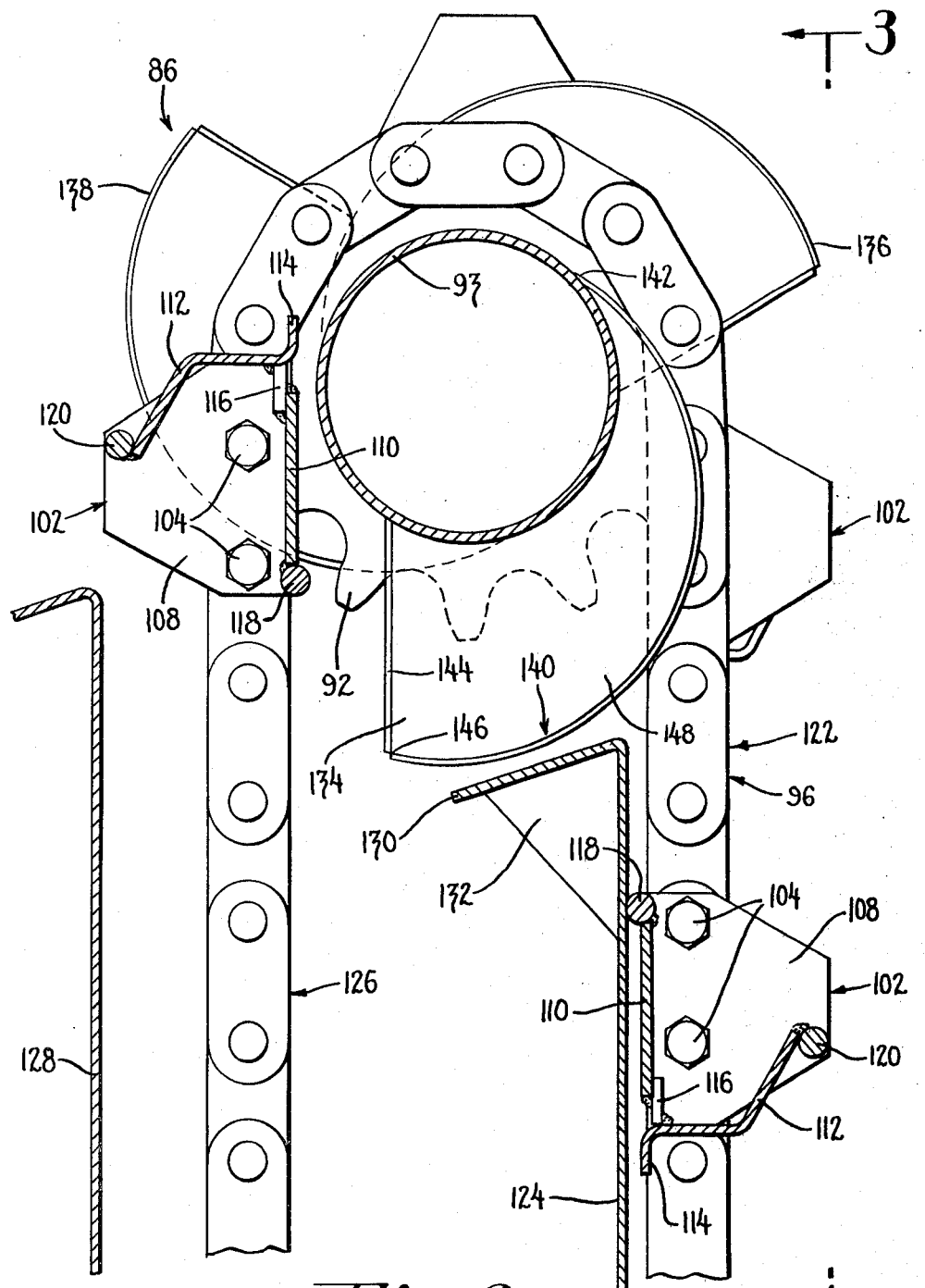
FIG. 2 is an enlarged cross sectional view of the upper roller of the endless chain and slat conveyor including the projection means for doffing excess billets.

The projections 134, 136 and 138 as shown in FIG. 3 extend along the length of the upper shaft 88 between the sprockets 92. Each of the projections extend substantially from one sprocket 92 to the next. The projection 134 is spaced 120 degrees behind the projection 136 and 240 degrees behind the projection 138 as shown in FIG. 2. The conveyor slats 102 are mounted between the endless chains 94, 96, 98 and 100 so that they move in a timed relationship relative to the projections 134, 136 and 138 and are not contacted by these projections. By spacing the projections 134, 136, 138 around the circumference of the upper shaft 88, billets from one conveyor slat 102 at a time are dumped thereby making the dispensing rate more uniform.

The billet metering mechanism 18 also includes a chute 152 with side walls 154 and a floor 156. The floor 156 has an upper edge that is integral with the upper edge of the outer wall 128. The free end of the chute 152 is supported by a brace 158 connected to the horizontal fore and aft rear frame section 26.

Billets, as they slide down the floor 156 of the chute 152 are generally orientated so that they fall into the chute 160. The chute 160 has front, rear and side walls 162, 164, 166 and 168 at the top. These walls terminate in a lower portion with a downwardly and rearwardly inclined bottomwall 170 and side walls 172. The chute 160 has arms 174 attached to its side walls 166 and 168. The lower ends of these arms 174 are pivotally attached to the mast members 49. The rearwardly inclined bottom wall 170 extends down between the furrow forming plates 62.

The fertilizer distributor 22 includes at least one metering auger tube 176 with attached supports 178 and 180 secured to the horizontal fore and aft rear frame section 26. A fertilizer box 182 is secured to one end of the metering auger tube 176. A flexible discharge tube 184 is connected to the other end of the metering auger tube 176. The lower delivery end of the flexible discharge tube 184 is connected to a rigid tube 186 that discharges fertilizer in a furrow to the side of the planted billets. The drive 24 includes a chain 188 trained around a sprocket 190 secured to one of the support wheels 28 and a sprocket 192 on a shaft 194. The endless chain and slat conveyor 86 is driven by an endless chain 196 trained around a sprocket 198 on the shaft 194 and a sprocket 200 on the lower shaft 90 of the endless chain and slat conveyor 86. An endless chain 202 is trained around a third sprocket 204 on the shaft 194 and a sprocket 206 on the input shaft 208 of a right angle gear box 211. The output 210 of the right angle gear box 211, which is driven by gears 212 and 214, drives sprocket 216. The sprocket 216 drives an endless chain 218 which drives a sprocket 220 on the fertilizer metering auger 221. An adjustable idler sprocket 222 is provided to tighten chain 188. An adjustable idler sprocket 224 is provided to tighten endless chain 196.

In operation, the conveyor slats 102 of the endless chain and slat conveyor 86 move through the sugar cane billet hopper 16 and up the wall 124. Cane billets are lifted from the mass of billets in the hopper 16 by the conveyor slats 102. As the conveyor slats 102 approach the upper shaft 88, excess billets are engaged by the arcuate member 140 of a projection 134, 136 or 138 and knocked off the conveyor slat 102. These excess billets fall on the return sheet 226. The return sheet is secured to the side walls 70 and 72 of the sugar cane billet hopper 16. The cane billets slide down the return sheet 226 away from the endless chain and slat conveyor 86 and onto the mass of billets in the sugar cane billet hopper 16. By conveying the excess billets away from the endless chain and slat conveyor 86, a billet is not picked up by the conveyor slats 102 and dropped several times resulting in damage to the eye sufficient to prevent it from growing. The round rod 120 on the leading edge of the slats keeps billet eye damage to a minimum.

Billets which are not urged off the conveyor slats 102 by the arcuate member 140 of the doffer fall onto the floor 156 of the chute 152. As the billets slide down the floor 156 they are preferably oriented with one end leading. The billets fall from the chute 152, through the upper portion of chute 160 and land on the rearwardly inclined bottom wall 170. Billets normally slide off the end of the rearwardly inclined bottom wall 170 in an end to end relationship with an upper billet pushing against a lower billet.

The sugar cane billet planter which has been described and shown plants one row at a time. Obviously, it could be modified to plant two or more rows on each pass through a field if desired.

I claim:
1. A sugar cane billet planter including a frame, a hitch assembly on the frame for attaching the frame to a draft vehicle, a sugar cane billet hopper mounted on the frame and a billet metering mechanism characterized by a billet delivery assembly mounted on the frame capable of delivering billets to a furrow in the soil and an endless chain and slat conveyor mounted on the frame capable of conveying billets out of the hopper and delivering them to the cane billet delivery assembly, and including an upper roller with projection means that extend outwardly from the axis of rotation of the upper roller past the endless chain and between the slats and capable of doffing excess billets from the slats.

2. A sugar cane billet planter as set forth in claim 1 characterized by the projection means that extends outwardly from the axis of rotation of the upper roller including an arcuate surface that engages excess cane billets conveyed by the slats.

3. A sugar can billet planter as set forth in claim 2 characterized by the distance from the axis of rotation of the upper roller to the arcuate surface increasing from a minimum distance at the leading edge to a maximum distance at the trailing edge.

4. A sugar cane billet planter as set forth in claim 3 characterized by the endless chain and slat conveyor including a lower roll, at least three endless chains trained around the upper roll and the lower roll with the slats extending from one endless chain to an adjacent chain and a plurality of projection means on the upper roller, one of which projects outwardly between each pair of adjacent endless chains.

5. A sugar cane billet planter as set forth in claim 1 characterized by the endless chain and slat conveyor including a lower roll, at least three endless chains trained around the upper roll and the lower roll with the slats extending from one endless chain to an adjacent chain and a plurality of projection means on the upper roller, one of which projects outwardly between each pair of adjacent endless chains.

6. A sugar cane billet planter as set forth in claim 5 characterized by each projection means on the upper roller being angularly offset from the other projection means about the axis of rotation of the upper roller.

7. A sugar cane billet planter as set forth in claim 1 characterized by a return sheet mounted on the planter adjacent and below the upper roller of the endless chain and slat conveyor operable to catch billets knocked off the slats by the projection means and convey them away from the endless chain and slat conveyor and into the hopper.

* * * * *